Jan. 4, 1927.

O. H. HANSEN 1,612,811

CAN FILLING MACHINE

Filed Dec. 13, 1920    4 Sheets-Sheet 1

INVENTOR.
O. H. Hansen
BY
W. H. Lieber
ATTORNEY.

Jan. 4, 1927.

O. H. HANSEN

CAN FILLING MACHINE

Filed Dec. 13, 1920      4 Sheets-Sheet 3

1,612,811

INVENTOR.
O. H. Hansen
BY
W. H. Lieber
ATTORNEY.

Patented Jan. 4, 1927.

1,612,811

UNITED STATES PATENT OFFICE.

OSWALD H. HANSEN, OF PORT WASHINGTON, WISCONSIN, ASSIGNOR, BY DIRECT AND MESNE ASSIGNMENTS, TO HANSEN CANNING MACHINERY CORPORATION, A CORPORATION OF WISCONSIN.

CAN-FILLING MACHINE.

Application filed December 13, 1920. Serial No. 430,131.

This invention relates in general to improvements in the structure and operation of devices which are adapted to measure and deliver batches of substance in quick succession, and relates more specifically to improvements in the construction of filling machines for automatically and rapidly delivering to successive cans or other receptacles, accurately measured homogeneous quantities of material such as granular or pulverulent material, liquid, or a mixture of solids and liquid.

A general object of the invention is to provide a can filling machine which is simple and compact in construction and efficient in operation. Another general object is to provide instrumentalities for automatically delivering to successive receptacles of a series traveling at a high rate of speed, accurately measured batches of material. A further object is to provide a number of advantageous features which are applicable to various types of fillers regardless of the nature of the substances which they are especially adapted to handle.

Some of the more specific objects of the invention are:—

To provide exceedingly efficient apparatus for packing materials into relatively large containers or receptacles such as gallon cans.

To provide an automatic filler operable at a high rate of speed and capable of measuring and delivering various kinds of material.

To provide a machine operable with minimum power and attention.

To provide a filling machine which is positive and accurate in its operation, and which entirely eliminates waste and injury of the materials.

To provide a simple and strong can filling structure which is neat in appearance and which will not be materially damaged when subjected to abnormal conditions of operation.

To provide a simple, mechanical and compact structure in which all elements are readily accessible for cleaning, inspection or renewal.

To provide a device for packing substances into receptacles, which may be quickly assembled and dismantled, and in which standard parts of other types of fillers may be utilized.

To provide a mechanism which avoids necessity of utilizing complicated valve structures.

To provide means for insuring delivery of batches of mixture of uniform consistency to successive receptacles.

To provide means for precisely and rapidly altering the volumes of the measured quantities or the proportions of the materials in batches of mixture, without interrupting the operation of the filler.

To provide a filler mechanism which will cooperate with a standardized frame, drive mechanism and can transporting mechanism.

To provide various improvements in the construction of measuring cups for can filling machines generally.

To provide improvements in the construction and operation of can filling machines, which will reduce to a minimum the cost of manufacture and of operation, and which will increase to a maximum the efficiency of such machines.

Some of the novel features disclosed but not specifically claimed herein, form the subject of copending applications for Letters Patent, including Serial No. 197,809, filed October 22, 1917, Serial No. 214,205, filed January 28, 1918, and others.

While the present specification utilizes relatively specific descriptive terms, it is not intended to thereby limit the scope of the invention. Although the machine illustrated is especially adapted to fill open topped sanitary tin cans, the term "can" is intended to designate any kind or form of receptacle. The term "filling" is not descriptive of complete filling only, but is also applied to a partial filling of the receptacles. The machine is operable upon granular materials or upon liquids alone, although it is described as operating upon a mixture of granular material and liquid. The principles of the invention are applicable to various machines for automatically feeding pre-measured quantities of substance to receptacles.

A clear conception of several embodiments of the invention and of the operation of devices constructed in accordance therewith, may be had by referring to the drawings accompanying and forming a part of this specification, in which like reference characters designate the same or similar parts in the various views.

Fig. 4 is an enlarged top view of one form of measuring pockets for the improved automatic can filling machine.

Fig. 5 is an enlarged central vertical section through the measuring pockets of the improved automatic can filling machine, disclosed in Fig. 4, the section being taken along the line V—V of Fig. 4.

Fig. 6 is a fragmentary enlarged central vertical section through another form of measuring pocket for the improved automatic can filling machine.

Fig. 7 is a fragmentary enlarged central vertical section through still another form of measuring pocket for the improved automatic can filling machine.

Figure 1:
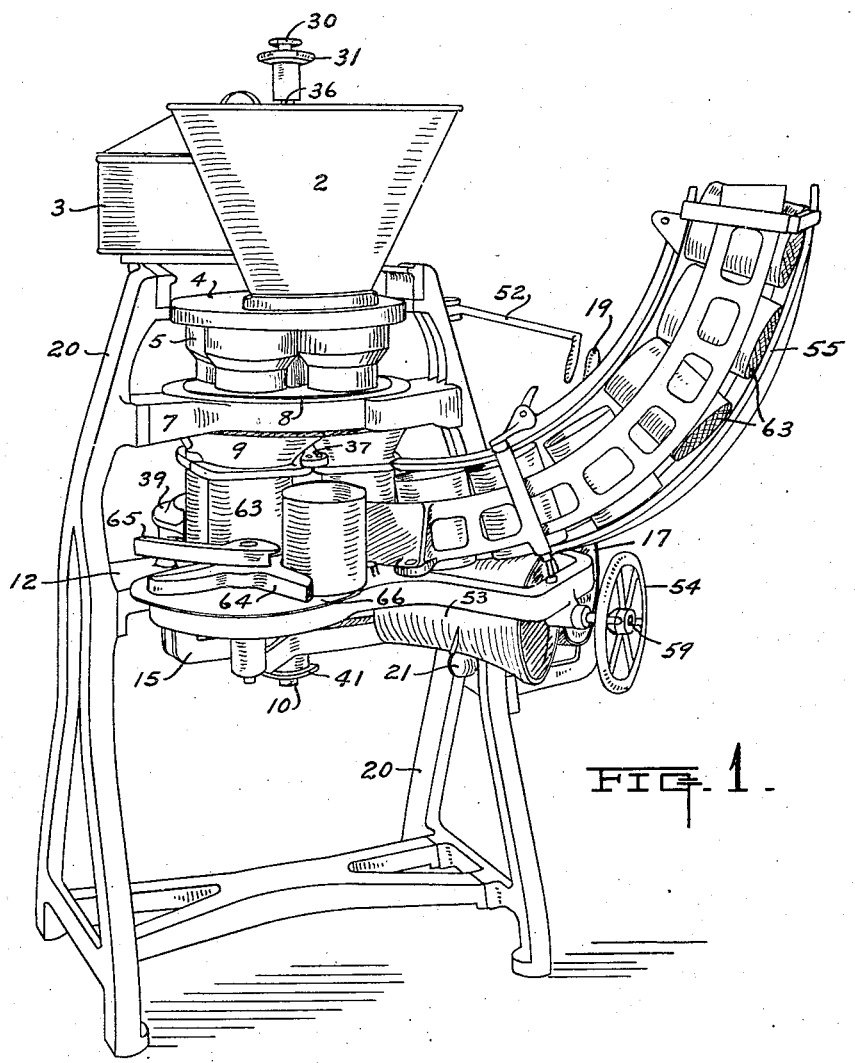
Fig. 1 is a perspective view of an improved automatic can filling machine.
Figure 2:
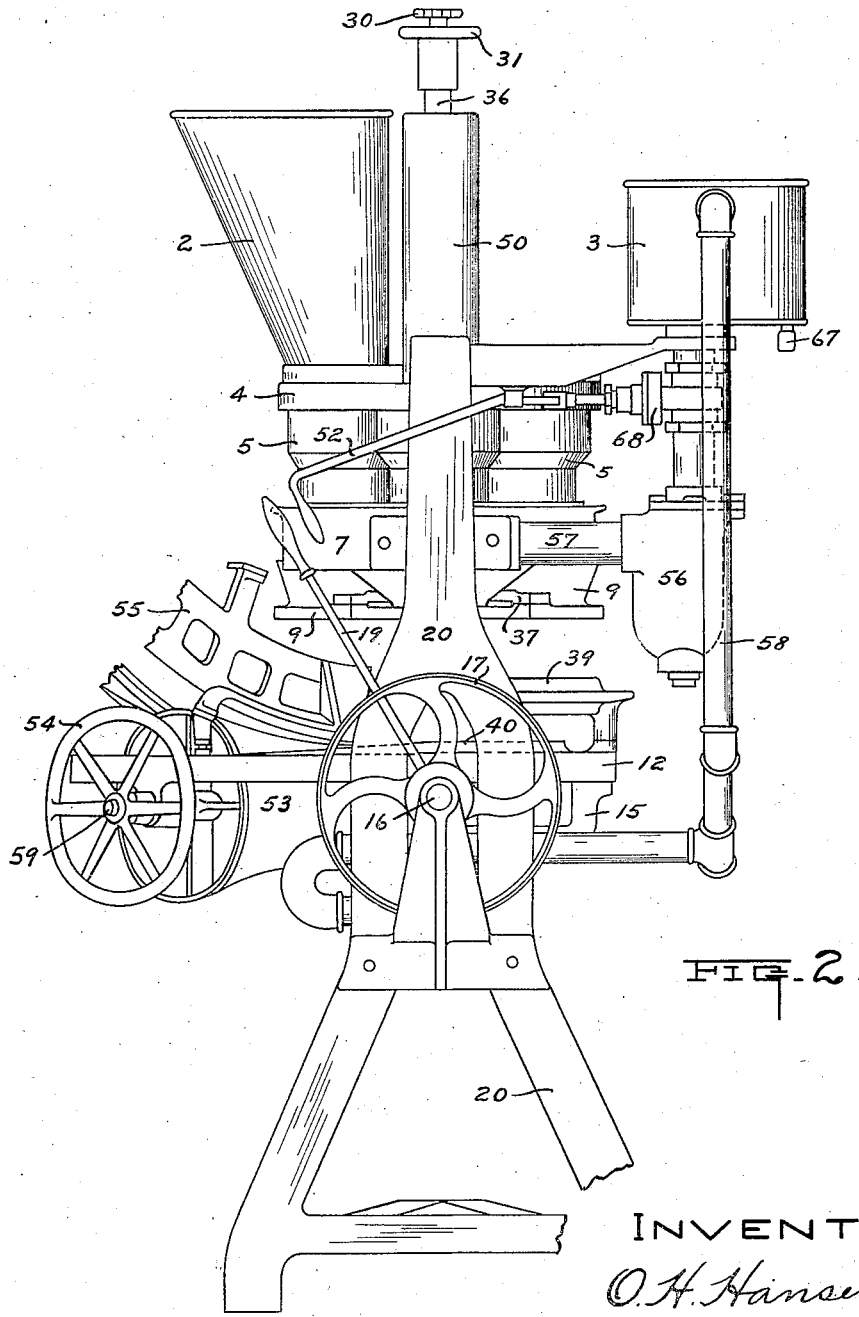
Fig. 2 is a side elevation of the improved automatic can filling machine.
Figure 3:
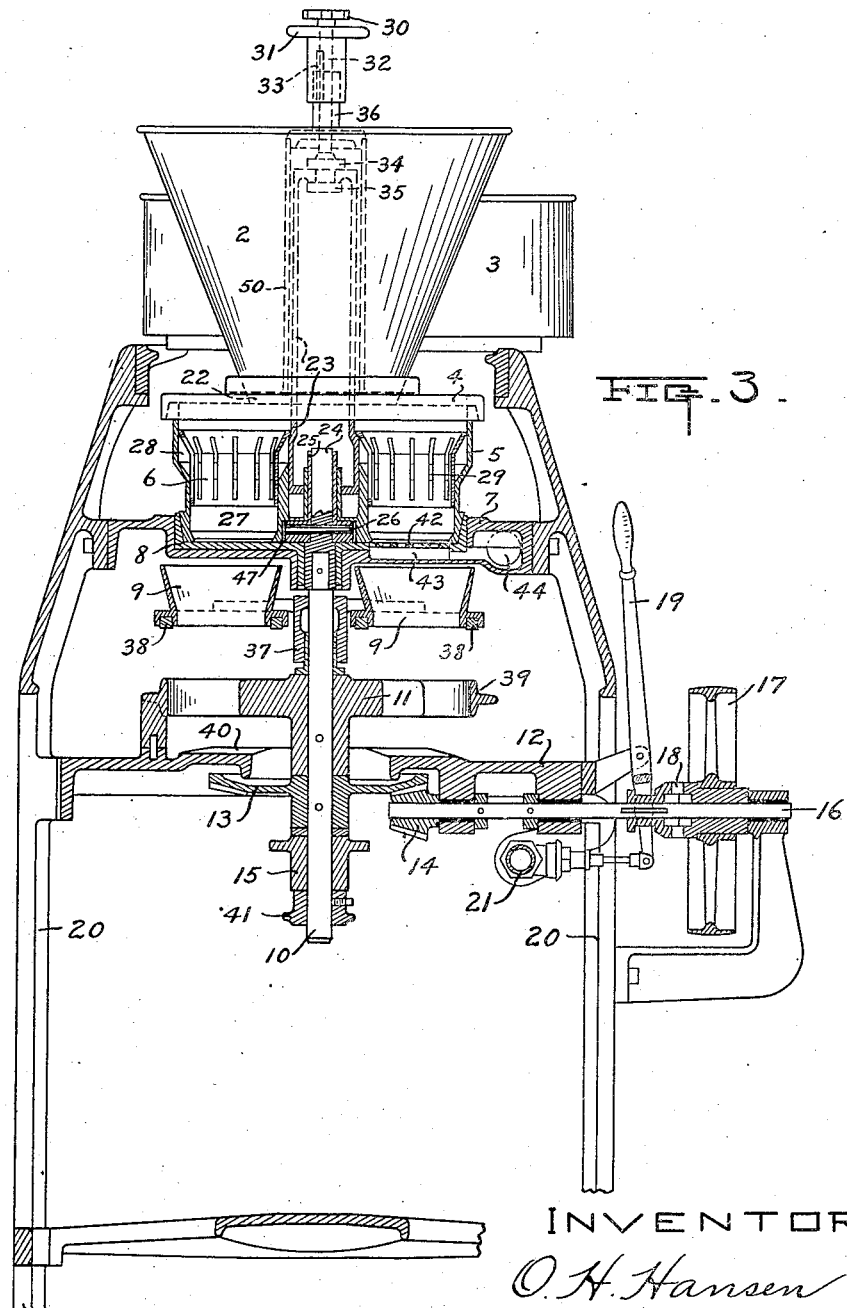
Fig. 3 is a part sectional front elevation of the improved automatic can filling machine.
Figure 3:
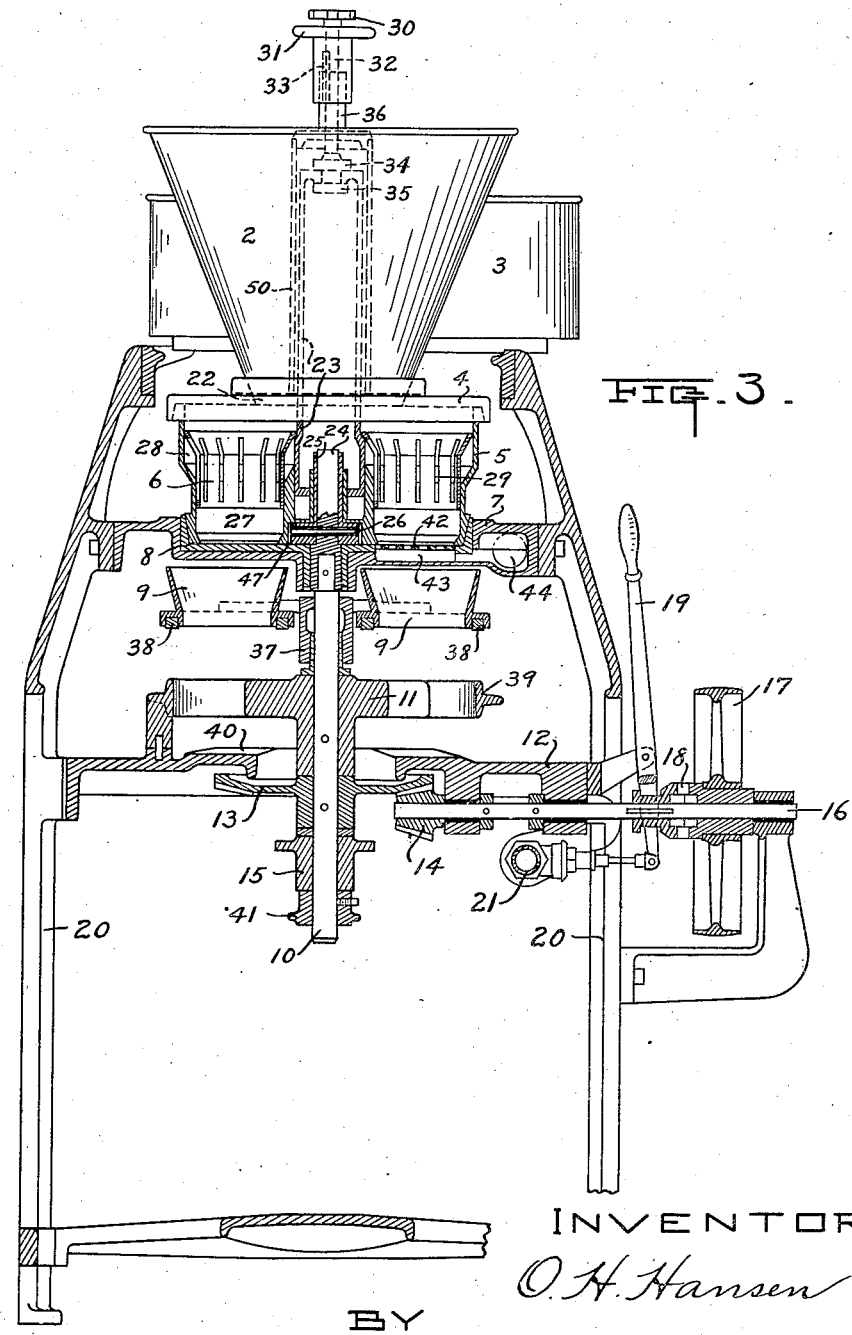

The frame structure of the improved automatic can filling machine shown in Figs. 1 to 3 inclusive, comprises a pair of laterally spaced vertical side frames 20 which are interconnected at their lower portions by means of a horizontal cross-frame, at their medial portions by means of a horizontal cross-frame 12, and at their upper portions by means of a horizontal cross-frame 7 and an upper frame 4. The driving mechanism comprises a horizontal power shaft 16 supported in bearings formed integral with the cross-frame 12 and in an outer bearing attached to one of the side frames 20, and a vertical main shaft 10 supported in an upper bearing in the cross-frame 7 and in a lower bearing formed in the auxiliary frame 15. A driving pulley 17 is loosely mounted upon the power shaft 16 and may be drivingly connected to the shaft 16 by means of a jaw clutch 18. The movable clutch element is splined upon the shaft 16 and is shiftable to make and break the driving connection, by means of the operating lever 19 which is pivoted upon the adjacent side frame 20 and has a lower direct operating connection with the main liquid or brine supply valve 21. The inner extremity of the horizontal power shaft 16 is provided with a bevel pinion 14 which meshes with the bevel gear 13 secured to the vertical main shaft 10. Upward displacement of the vertical shaft 10 is prevented by means of a collar 41 secured to the lower end thereof.

The can feeding mechanism also shown in Figs. 1 to 3 inclusive, comprises a can guide 55 which is adapted to deliver the cans 63 in succession upon the upper portion of the rotatable feed drum 53. The inner end of the feed drum 53 is provided with a helical projection which is adapted to engage the lower rear portions of the successive cans 63 and to deliver the cans upon the upper supporting and elevating surface 40 of the medial cross-frame 12. The feed drum 53 is secured to a horizontal shaft 59 one end of which is provided with a hand wheel 54 for interchangeably operating the machine while changing grades, and the opposite end of which is geared to the bevel gear 13. The shaft 59 is mounted in bearings secured to the medial cross-frame 12.

The can transporting mechanism comprises a series of four can hooks formed integral with the conveying element 11 secured to the vertical shaft 10. The can hooks formed on the element 11 are adapted to slide the successive cans 63 along the elevating surface 40 of the frame 12 and along a stationary horseshoe shaped guide 39 which confines the movement of the cans 63 to a circular path concentric with the axis of the main shaft 10. A series of four funnels 9 are carried by a supporting element or carrier 37 secured to the main shaft 10, and are provided with sealing rings 38 against which the elevating surface 40 urges the tops of the cans 63 during filling.

The can discharging mechanism comprises a rotary disc 66, a revolving can ejector 64, and an adjustable stationary ejecting guide 65. The horseshoe shaped can guide 39 extends from the feed drum 53 around the shaft 10, terminating adjacent to the can ejector 64. The ejector 64 and disc 66 are also driven from the main gear 13 in any convenient manner. The can handling mechanism comprising the feeding, transporting and discharging mechanisms, is adapted to gently feed, transport and deliver the successive cans 63 to, through and from the filler without in any way damaging the cans 63 or wasting material by splashing.

The material measuring and feeding mechanism forming the major subject of the present invention, comprises a granular material supply hopper 2, a liquid supply tank 3, and a series of four revoluble measuring pockets formed in the measuring element 5. The granular material supply hopper 2 is supported upon the upper stationary frame 4 and is adapted to deliver granulated solid material by gravity, downwardly through an opening 22, see Figs. 3, 4 and 5. The liquid supply tank 3 is also supported from the upper stationary frame of the machine, and is adapted to deliver liquid such as brine by gravity, downwardly through a control valve 68, liquid purifier or separator 56, piping 57 and an opening 44 to a chamber 43 formed in the cross-frame 7. The flow of liquid from the tank 3 through the valve 68, is controllable by means of a lever 52 having an actuating handle in close proximity to the handle of the power control lever 19. The liquid is supplied to the tank 3 through a pipe 58 in which the main supply valve 21 is located. The tank 3 is preferably provided with a drain 67 and a check valve of usual form for preventing overflow of liquid from the tank 3. The liquid supply chamber 43 communicates directly with upwardly directed openings in a grid 42 which is formed integral with the stationary discharge element 8. The element 8 is rigidly secured to the cross frame 7, and has a mixture discharge opening 45 therein, the element preferably being formed of bronze or similar material. The rotary measuring element 5 is rotatably supported in tapered bores in the element 8 and frame 4 and has four vertical through openings forming measuring pockets. Each of the measuring pockets of the form disclosed in Figs. 3, 4 and 5, is provided with a slotted vertically adjustable sleeve 6 forming a partition which divides the pocket into two chambers 27, 28 of which the chamber 27 is located within the sleeve 6 and the chamber 28 is annular and surrounds the same. Open communication between these chambers 27, 28 is maintained by virtue of the slots 29 which are sufficiently narrow to prevent granular material from the hopper 2 from entering the chamber 28, but which will permit free entrance of liquid to the chamber 28. The sleeves 6 have peripheral upper flanges which closely fit the bores in the element 5 and the inner adjacent portions of which coact with grooves 51 formed in the adjusting member 23. The lower extremity of the adjusting member is drivingly connected to the element 5 by means of drive pins 46 screw threaded in the element 5. The element 5 is drivingly associated with an auxiliary drive shaft end 24 by means of a drive element 25 and a transverse tapered drive pin 26 which penetrates the shaft end 24 and the lower transverse driving block of the element 25, see Figs. 3 and 4. The lower portion of the element 5 is provided with an eccentric recess 47 within which the driving head of the element 25 will fit in one position only, thus insuring proper assembly of the machine. The shear pin 26 is of sufficient strength to transmit ordinary loads to the measuring element 5, but will break upon being subjected to abnormal loads, thus safe guarding the measuring mechanism. The shaft end 24 is rigidly but detachably secured to the upper end of the vertical shaft 10 in any convenient manner.

The rotary adjusting member 23 extends upwardly within a stationary hollow adjusting column 50 which is formed integral with the upper frame 4 and has an upper cap 36 secured to its upper end by means of screw threads and a locking dowel 48. The cap 36 is provided with a screw threaded portion 49 with which the manually adjustable sleeve 31 coacts. This sleeve 31 is rotatably associated from moving axially relatatably associated with the upper end of the adjusting rod 32 being prevented from moving axially relatively to the rod 32 by means of a lock nut 30. The adjusting rod 32 is held against rotation by means of a spline 33 coacting with a groove in the threaded portion 49 of the cap 36. The lower extremity of the adjusting rod 32 is provided with a head 35 which coacts with a lower surface of the rotary member 23 to form a thrust bearing for this member. A nut 34 secured to the rod 32 prevents axial upward displacement of the member 23 along the rod 32.

In the specific form of measuring pocket disclosed in Fig. 6 the element 5 is provided with non-adjustable imperforate sleeves 60 forming measuring chambers 61 of desired capacity and forming dead spaces 62 surrounding the measuring chambers 61 and the sleeves 60. The sleeves 60 are provided with downwardly enlarging tapered bores for the purpose of enabling the material dropping from the pockets to automatically move out of engagement with the sleeve walls. Such structure positively prevents bridging of the pockets by granulated solid material.

In the specific form of measuring pocket disclosed in Fig. 7, the element 5 is provided with non-adjustable imperforate lower sleeve sections 69 and relatively adjustable imperforate upper sleeve sections 70 associated with the notches 51 of the adjusting member 23. The upper adjustable sleeves 70 form dead spaces 72 of variable volume, while the cooperating sleeves 70, 69 form variable measuring chambers 71. The sleeve sections 70, 69 are provided with downwardly enlarging tapered bores for the purpose of enabling the material dropping from the pockets to automatically move away from the sleeve walls.

During normal operation of the can filling machine, power is applied to the drive pulley 17 and the lever 19 is moved to the left as viewed in Fig. 3, thereby simultaneously throwing in the clutch 18 and opening the main liquid supply valve 21. Liquid is then permitted to flow through the pipe 58 thereby filling the tank 3. As the clutch 18 is thrown in, rotation is imparted to the power shaft 16, pinion 14 and gear 13. The rotary motion of the bevel gear 13 is communicated to the vertical main shaft 10 and the elements associated therewith, as well as to the can feed drum 53 and to the discharge disc 66 and ejector 64. The rotating feed drum 53 delivers the successive cans 63 into the path of the can hooks of the transporting element 11 which engage and urge the cans 63 along the elevating surface 40 and the guide 39. As the cans 63 advance along the surface 40, they are pushed up and firmly against the sealing rings 38 of the funnels 9, being subsequently withdrawn from these rings by gravity and delivered upon the discharge disc 66. The can ejector 64 and can guide 65 delivered the filled cans 63 from the disc 66 in the desired direction.

As the vertical main shaft 10 rotates, it causes the measuring element 5 and the pockets formed therein to revolve in an anticlockwise direction as viewed in Fig. 4. Granular material is then supplied to the hopper 2 and liquid is permitted to enter the chamber 43 by operating the lever 52 to open the control valve 68, the liquid thus admitted to the chamber 43 being subjected to pressure due to the elevation of the tank 3 above this chamber. As the successive measuring pockets pass the opening 22 in the frame element 4, the inner chambers 27 thereof are filled with granular material which gravitates from within the hopper 2. The successive measuring pockets are then advanced over the grid 42 whereupon liquid flows from the chamber 43 upwardly into the pockets filling the chambers 28 and the voids of the granular material previously deposited into the pockets. The pockets thus completely filled with mixture of granular material and liquid, are successively advanced to positions in line with the discharge opening 45. Whereupon the charges of mixture are dropped through the funnels 9 into the cans 63 below. Although the granular material supply opening 22 overlaps the grid 42, no liquid will flow upwardly through the opening 22, due to the high speed of operation of the machine and the fact that some time is required for the liquid to percolate upwardly through the granular material. The successive filled measuring pockets are however completely sealed after they leave the grid 42 and before they communicate with the discharge opening 45.

In this manner the successive cans 63 are successively supplied with like homogeneous batches of mixture of granular material and liquid and are automatically delivered from the machine without wasting a particle of the material. If it is desired to vary the proportions of solids and liquid in the measured batches, the sleeve 31 may be manipulated to either raise or lower the rod 32 and sleeves 6. By raising the sleeves 6, less granular material and more liquid is incorporated in each charge of mixture, while a mixture containing more granular material and less liquid results from lowering the sleeves 6. This adjustment may be made without interrupting operation of the machine and enables very accurate proportioning of the ingredients of the mixture.

The machine may be quickly completely stopped by simultaneously manipulating the levers 52, 19, to simultaneously close the valves 68, 21 and to disconnect the power clutch 18. During changing of grades, the valve 68 may be left open while the valve 21 is closed and the clutch 18 is disconnected. The machine may then be operated manually by manipulation of the hand wheel 54. If a bolt or other hard substance becomes lodged between the movable measuring element 5 and an adjacent stationary part of the machine, the shear pin 26 will break rather than permitting the jammed elements to be damaged.

All parts of the machine are readily accessible for cleaning, sterilizing and inspection. The upper frame 4 may be freely vertically removed to expose the measuring pockets, by merely removing the nut 30. The adjusting element 23 and the sleeves 6 as well as the measuring element 5 are then likewise freely vertically removable to openly expose every element of the structure. The eccentric recess 47 insures proper assembly of the machine. The measuring pockets are preferably formed cylindrical in order to facilitate their manufacture, and practically all elements may be finished in an ordinary lathe. By forming the measuring pocket sleeves downwardly tapering as illustrated in Figs. 6 and 7, the material is positively prevented from bridging the pockets, such action sometimes occurring in relatively small measuring pockets. The use of a series of four measuring pockets as illustrated, is preferable in machines for filling relatively large receptacles, as the pockets may then be brought relatively close to the axis of rotation and the machine operated at very high speed.

It should be understood that it is not desired to limit the invention to the exact details of construction and of operation herein shown and described for various modifications within the scope of the claims may occur to persons skilled in the art.

It is claimed and desired to secure by Letters Patent:—

1. In a filling machine, a measuring pocket, means dividing said pocket into two chambers, means for admitting granular material to one of said members only, and means for admitting liquid directly to one of said chambers and through said dividing means to the other.

2. In a filling machine, a measuring pocket, means dividing said pocket into chambers, means for relatively moving said pocket and said dividing means to vary the relative sizes of said chambers, and means for admitting liquid to both of said chambers.

3. In a filling machine, a measuring pocket, means dividing said pocket into chambers, means for relatively moving said pocket and said dividing means to vary the relative sizes of said chambers, means for admitting one kind of material to one of said members only, and means for admitting another kind of material to both of said chambers.

4. In a filling machine, a measuring pocket, means dividing said pocket into chambers, means for admitting granular material to one of said chambers only, and means for subsequently admitting liquid to both of said chambers.

5. In a filling machine, a measuring pocket, and adjustable partition dividing said pocket into chambers one of which is annular and surrounds to the other, means for moving said partition to vary the relative sizes of said chambers, means for admitting granular material to one of said chambers only, and means for admitting liquid to both of said chambers.

6. In a filling machine, a measuring pocket, an adjustable partition dividing said pocket into a pair of chambers, means for admitting granular material to one of said chambers only, and means for admitting liquid to both of said chambers.

7. In a filling machine, a measuring pocket, means dividing said pocket into a pair of chambers, means for admitting one kind of material to one of said chambers only, and means for admitting liquid to both of said chambers.

8. In a filling machine, a measuring pocket, means dividing said pocket into a pair of chambers, means for admitting one kind of material to one of said chambers through an upper portion of said pocket, and means for admitting another kind of material to both of said chambers through a lower portion of said pocket.

9. In a filling machine, a series of measuring pockets, means dividing each of said pockets into two chambers, means for admitting liquid to both chambers of successive pockets of said series, and means for admitting granular material to one chamber of successive pockets of said series.

10. In a filling machine, a series of measuring pockets, means dividing each of said pockets into two chambers, means for admitting liquid to both chambers of successive pockets of said series through the lowermost portions of said pockets, and means for admitting granular material to one chamber of successive pockets of said series through upper portions of said pockets.

11. In a filling machine, a series of measuring pockets revoluble about an axis, means for admitting granular material to upper portions of said pockets, and means for admitting liquid to lowermost portions of said pockets, said admission means being communicable through said pockets.

12. In a filling machine, a movable measuring pocket, means for admitting granular material to said pocket, means for admitting liquid to said pocket during and subsequent to said admission of granular material thereto, means for subsequently sealing said pocket, and means for effecting discharge of the contents of said pocket.

13. In a filling machine, a series of four measuring pockets revoluble about a vertical axis, means for admitting granular material to successive pockets of said series, means for subsequently admitting liquid to the lowermost portions of successive pockets of said series while said pockets are in communication with said granular material admission means, and a means forming a discharge opening communicable with successive pockets of said series.

14. In a filling machine, a series of four measuring pockets revoluble about a vertical axis, means for admitting granular material to successive pockets of said series, means for subsequently admitting liquid to the lowermost portions of successive pockets of said series, while said pockets are in communication with said granular material admission means, means forming a discharge opening communicable with successive pockets of said series, and means for sealing said admission means from communication with said discharge opening through said pockets.

15. In a filling machine, a series of four measuring pockets revoluble about an axis, means for admitting granular material to the upper portions of successive pockets of said series, means for subsequently admitting liquid to the lowermost portions of successive pockets of said series, while said pockets are in communication with said granular material admission means, means forming a discharge opening communicable with the lowermost portions of successive pockets of said series, and means for sealing said admission means from said discharge opening.

16. In a filling machine, a stationary element having an opening, a source of liquid supply communicable with said opening, a movable pocket having a lower opening communicable with said source through said element opening, and a perforated partition dividing said pocket into constantly communicating chambers.

17. In a filling machine, means for measuring a definite quantity of granular material, means forming a chamber constantly communicating with said measuring means, means for forcing upwardly into the voids of said granular material and into said chamber just sufficient liquid to produce a predetermined quantity of mixture, and means for delivering the mixture to a receptacle.

18. In a filling machine, means for measuring a definite quantity of granular material, means forming an annular chamber surrounding and constantly communicating with said granular material measuring means, means for forcing upwardly into the voids of said granular material and into said chamber just sufficient liquid to produce a predetermined quantity of mixture, and means for delivering the mixture to a receptacle.

19. In a filling machine, means for measuring a definite quantity of granular material, means forming a chamber constantly communicating with said granular material measuring means, means for varying the relative volumes of said measuring means and said chamber, means for admitting liquid to the voids of said granular material and to said chamber to produce a definite quantity of mixture, and means for delivering the mixture to a receptacle.

20. In a filling machine, a measuring pocket, means for delivering granular material directly to said pocket, means within said pocket for preventing occupation of the entire pocket space by granular material, and means for subsequently completely filling said pocket with liquid.

21. In a filling machine, a series of measuring pockets, means for delivering granular material directly to successive pockets of said series, means within each of said pockets for preventing occupation of the entire pocket space by granular material, and means for subsequently completely filling successive pockets of said series with liquid.

22. In a filling machine, a series of measuring pockets, a partition dividing each of said pockets into a pair of constantly communicating chambers, and means common to all of said partitions for moving the same within said pockets to vary the relative volumes of said chambers.

23. In a filling machine, a series of measuring pockets, a perforated partition dividing each of said pockets into a pair of constantly communicating chambers, and means for simultaneously adjusting said partitions along said pockets.

24. In a filling machine, a series of measuring pockets movable about an axis, a perforated partition dividing each of said pockets into a pair of constantly communicating chambers, and means common to all of said partitions for simultaneously adjusting the same along said pockets equal amounts.

25. In a filling machine, a series of measuring pockets revoluble about a vertical axis, a perforated annular sleeve forming a partition dividing each of said pockets into a plurality of chambers, and means concentric with said axis for simultaneously adjusting said sleeves along said pockets.

26. In a filling machine, an annular series of measuring pockets revoluble about a vertical axis, a sleeve within each of said pockets dividing the same into two chambers and means for simultaneously adjusting all of said sleeves along said pockets to vary the relative sizes of said chambers.

27. In a filling machine, an annular series of measuring pockets revoluble about a vertical axis, a vertically movable sleeve dividing each of said pockets into two chambers, and means located above said pockets for simultaneously vertically adjusting all of said sleeves to vary the relative sizes of said chambers.

28. In a filling machine, a series of measuring pockets, an annular laterally perforated partition dividing each of said pockets into a plurality of chambers, and means for moving all of said partitions within said pockets.

29. In a filling machine, upper and lower stationary frames, a measuring element having pockets movably mounted between said frames, a sleeve within each of said pockets, means for adjusting said sleeves relatively to said stationary frames, and means coacting with said adjusting means for locking said frames and said element against endwise displacement.

30. In a filling machine, means forming a plurality of measuring pockets, vertically movable sleeves in said pockets, a single vertically movable member supporting all of said sleeves, and a stationary supporting bearing for said member located above said pockets.

31. In a filling machine, means forming a plurality of measuring pockets revoluble about a vertical axis, vertically movable sleeves in said pockets, a single vertically adjustable member supporting all of said sleeves, and a stationary adjustable bearing concentric with said axis for supporting said member.

32. In a filling machine, a measuring element movable about an axis and having a transverse recess extending different distances on opposite sides of said axis, and a driving shaft having a portion closely fitting said recess.

33. In a filling machine, a measuring element movable about an axis and having a transverse recess crossing and extending different distances on opposite sides of said axis and a driving shaft concentric of said axis having a driving portion closely fitting said recess.

34. In a filling machine, a measuring element movable about an axis and having a lower transverse elongated recess crossing and extending different distances on opposite sides of said axis, a shaft concentric of said axis, a driving element closely fitting said recess, and a shear pin connecting said shaft and said driving element.

35. In a filling machine, a movable measuring pocket, means dividing said pocket into several chambers, means for admitting granular material to one of said chambers only, and means for admitting liquid directly to one of said chambers and through said dividing means to another.

36. In a filling machine, a measuring pocket revoluble about an axis, means dividing said pocket into several chambers, means for admitting granular material to one of said chambers only, and means for admitting liquid directly to one of said chambers and through said dividing means to another.

37. In a filling machine, a measuring pocket movable about a vertical axis, means dividing said pocket into several chambers, means for admitting liquid upwardly to one of said chambers, and means for admitting liquid to one of said chambers through another during movement of said pocket.

38. In a filling machine, a movable measuring pocket, means dividing said pocket into several communicating measuring chambers, means for relatively moving said pocket and said dividing means to vary the relative sizes of said chambers, and means for admitting liquid to one of said chambers during movement of said pocket.

39. In a filling machine, a movable measuring pocket, means dividing said pocket into several chambers, means for relatively moving said pocket and said dividing means to vary the relative sizes of said chambers, means for admitting one kind of material to one of said chambers while in motion, and means for admitting another kind of material to both of said chambers while in motion.

40. In a filling machine, a movable measuring pocket, means dividing said pocket into several chambers, means for admitting granular material to one of said chambers while in motion, and means for subsequently admitting liquid to both of said chambers while in motion.

41. In a filling machine, a measuring pocket, means dividing said pocket into several chambers, means for relatively moving said pocket and said dividing means to vary the relative sizes of said chambers, and means for admitting liquid to one of said chambers through the other.

42. In a filling machine, a measuring pocket, means dividing said pocket into several concentric chambers, means for moving said dividing means aixally to vary the relative sizes of said chambers, means for admitting one kind of material to one of said chambers only, and means for admitting another kind of material to one of said chambers through the other.

43. In a filling machine, a measuring pocket, an annular laterally perforated partition dividing said pocket into a plurality of chambers, and means for moving said partition within said pocket.

44. In a filling machine, a measuring pocket movable about an axis, an annular laterally perforated partition dividing said pocket into a plurality of chambers, and means for effecting adjustment of said partition while said pocket is in motion.

45. In a filling machine, a series of measuring pockets, an annular laterally perforated partition dividing each of said pockets into a plurality of chambers, and means for simultaneously adjusting said partitions within said pockets.

46. In a filling machine, a series of measuring pockets movable about an axis, an annular laterally perforated partition dividing each of said pockets into a plurality of chambers, and means common to all of said partitions for simultaneously adjusting the same along said pockets equal amounts.

47. In a filling machine, a measuring pocket, means for moving said pocket, valve means for controlling delivery of liquid to said pocket, a tank, second valve means for controlling delivery of liquid to said tank, means for simultaneously stopping said pocket moving means and for effecting actuation of one of said valve means, and means located closely adjacent to said simultaneously acting means for effecting actuation of the other of said valve means.

48. In a filling machine, a measuring pocket, means for moving said pocket, a valve for controlling delivery of liquid directly to said pocket, a tank, a second valve for controlling delivery of liquid to said tank, a lever for simultaneously stopping said pocket moving means and for effecting closure of one of said valves, and a second lever manipulable simultaneously with said double functioned lever to effect operation of the other of said valves.

49. In a filling machine, a series of measuring pockets revoluble about an axis, means for admitting granular material to successive pockets of said series, means for subsequently admitting liquid to successive pockets of said series while said pockets are still in communication with said granular material admission means, and means forming a discharge opening communicable with successive pockets of said series.

50. In a filling machine, a series of four measuring pockets revoluble about a vertical axis, means for admitting granular material to successive pockets of said series, means for subsequently admitting liquid to successive pockets of said series while said pockets are still in communication with said granular material admission means, means forming a discharge opening communicable with successive pockets of said series, and means for sealing said admission means from communication with said discharge opening through said pockets.

51. In a filling machine, a series of pockets revoluble about a vertical axis, means for admitting granular material to the upper portions of successive pockets of said series, means forming an opening a portion of which is vertically below said granular material admission means for subsequently admitting liquid to the lowermost portions of successive pockets of said series, and means forming a discharge opening communicable with successive pockets of said series.

52. A machine for filling cans with a mixture of granular and liquid material, comprising a movable series of measuring pockets for measuring a mixture of granular and liquid material, means for supplying an additional amount of liquid material to said measuring pockets, said last means comprising an auxiliary chamber into which liquid material can pass, and means for preventing the entrance of granular material thereinto.

53. A machine for filling cans with a mixture of granular and liquid material, comprising a measuring pocket for measuring a mixture of granular and liquid material, means for supplying an additional amount of liquid material to said measuring pocket, said last means comprising an auxiliary chamber, and a perforated barrier which prevents the granular material from entering the auxiliary chamber but permits the liquid material to enter it.

54. A machine for filling cans with a mixture of granular and liquid material, comprising a reservoir for the granular material, a reservoir for the liquid material, and a series of movable measuring devices for measuring definite quantities of the mixture, each measuring device comprising a main chamber which is supplied with a mixture of granular and liquid material and an auxiliary chamber in communication with said main chamber, and means for preventing the entrance of granular material into said auxiliary chamber.

55. A machine for filling cans with a mixture of granular and liquid material, comprising a reservoir for the granular material, a reservoir for liquid material, and a series of measuring devices for measuring definite quantities of the mixture, each measuring device comprising a main chamber, and an auxiliary chamber communicating with said main chamber and means for preventing the entrance of granular material into said auxiliary chamber whereby said main chamber will be filled with said granular material and liquid material will be supplied to fill the interspaces of the granular material and said auxiliary chamber.

56. In a filling machine, a measuring pocket revoluble about an axis, means dividing said pocket into chambers, means for admitting granular material to one of said chambers only during a part of each revolution, and means for subsequently admitting liquid to one of said chambers and through said dividing means to the other during another part of said revolution.

57. In a filling machine, a measuring pocket revoluble about an axis, means dividing said pocket into chambers, means for admitting granular material to one of said chambers only during a part of each revolution, means for subsequently admitting liquid to one of said chambers and through said dividing means to the other during another part of said revolution, and means for delivering both said granular material and said liquid from said pocket during still another part of said revolution.

In testimony whereof, the signature of the inventor is affixed hereto.

OSWALD H. HANSEN.